(12) United States Patent
Gu et al.

(10) Patent No.: US 11,218,868 B1
(45) Date of Patent: Jan. 4, 2022

(54) EMPLOYING BEACON MESSAGES TO RESTART AN APPLICATION ON A MOBILE DEVICE

(71) Applicant: NortonLifeLock Inc., Tempe, AZ (US)

(72) Inventors: Lei Gu, Bedford, MA (US); Sharad Subhash Mhaske, Ahmednagar (IN)

(73) Assignee: NORTONLIFELOCK INC., Tempe, AZ (US)

( * ) Notice: Subject to any disclaimer, the term of this patent is extended or adjusted under 35 U.S.C. 154(b) by 0 days.

(21) Appl. No.: 16/877,142

(22) Filed: May 18, 2020

(51) Int. Cl.
  *H04W 8/22* (2009.01)
  *H04W 4/029* (2018.01)
  *H04W 4/80* (2018.01)

(52) U.S. Cl.
  CPC .............. *H04W 8/22* (2013.01); *H04W 4/029* (2018.02); *H04W 4/80* (2018.02)

(58) Field of Classification Search
  CPC .......... H04W 4/029; H04W 4/80; H04W 8/22
  USPC ......................................................... 455/419
  See application file for complete search history.

(56) References Cited

U.S. PATENT DOCUMENTS

| 8,862,067 | B2 * | 10/2014 | Un | G01S 5/02 |
| | | | | 455/67.11 |
| 2013/0102300 | A1 * | 4/2013 | Sigal | H04W 4/48 |
| | | | | 455/418 |
| 2014/0254466 | A1 * | 9/2014 | Wurster | H04L 51/18 |
| | | | | 370/312 |
| 2015/0289207 | A1 * | 10/2015 | Kubo | H04W 4/80 |
| | | | | 370/311 |
| 2016/0217519 | A1 * | 7/2016 | Kozat | H04W 4/023 |
| 2017/0245106 | A1 * | 8/2017 | Connelly | H04L 65/602 |

OTHER PUBLICATIONS

Android Beacon Library—Radius Networks @ https://altbeacon.github.io/android-beacon-library/distance-triggering.html (Year: 2019).*
Google I/O 2016; "Introducing Nearby: Physical proximity within and without apps"; YouTube video; located at: https://www.youtube.com/watch?time_continue=930&v=Acdu2ZdBaZE; posted: May 18, 2016; accessed on May 19, 2020; 3 pages.

(Continued)

*Primary Examiner* — William Nealon
(74) *Attorney, Agent, or Firm* — Maschoff Brennan

(57) ABSTRACT

Employing beacon messages to restart an application on a mobile device. In some embodiments, a method may include subscribing, at the secondary mobile device, to a beacon publisher of the primary mobile device. The method may also include determining, based on historical location data, that the primary mobile device is likely within range of the secondary mobile device for beacon communication therebetween. The method may further include activating, at the primary mobile device, the beacon publisher. The method may also include publishing, at the primary mobile device, a beacon message configured to cause a secondary mobile application on the secondary mobile device to restart. The method may further include receiving, at the secondary mobile device, the beacon message. The method may also include, in response to receiving the beacon message, restarting, at the secondary mobile device, the secondary mobile application of the secondary mobile device.

20 Claims, 3 Drawing Sheets

(56) References Cited

OTHER PUBLICATIONS

Google Developers; Nearby—Messages API—Android—"Get Beacon Messages"; Webpage; located at: https://developers.google.com/nearby/messages/android/get-beacon-messages; Apr. 29, 2020; 3 pages.

Google Developers; Google APIs for Android—"MessagesClient"; Webpage; located at: https://developers.google.com/android/reference/com/google/android/gms/nearby/messages/MessagesClient#subscribe(com.google.android.gms.nearby.messages.MessageListener); Nov. 6, 2017; 4 pages.

Google Developers; "Turning an iOS Device into an iBeacon Device—Broadcast iBeacon signals from an iOS device"; Webpage; located at: https://developer.apple.com/documentation/corelocation/turning_an_ios_device_into_an_ibeacon_device; accessed on May 18, 2020; 2 pages.

\* cited by examiner

EMPLOYING BEACON MESSAGES TO RESTART AN APPLICATION ON A MOBILE DEVICE

BACKGROUND

Computer software applications configured to run on mobile devices (e.g., smartphones, tablets, etc.), also known as mobile applications or mobile apps, are increasingly popular in everyday life. Common mobile applications include email applications, calendar applications, contact applications, game applications, GPS applications, and shopping applications. While some mobile applications function properly when only run periodically, other mobile applications are configured to run constantly in order to function properly.

One mobile application that is configured to run constantly in order to function properly is a security application. A security application running on a mobile device may be configured to monitor and/or secure the mobile device. For example, a security application may be employed by a parent on a child's mobile device to monitor usage of the child's mobile device, a location of the child's mobile device, and/or time limits on the child's mobile device, and then regularly send logs of this monitored information to a corresponding security application running on the parent's mobile device.

One problem with a mobile application that is configured to run constantly is that the mobile application may occasionally cease to run. Continuing with the security application example, the security application may cease to run for some reason (e.g., if the child intentionally stops the security application on the mobile device, or if an operating system stops the security application on the mobile device to conserve resources, etc.). If the security application ceases to run, the child's mobile device will no longer send logs of this monitored information to the parent's mobile device, and the parent will thus no longer be able to be regularly updated on the usage of the child's mobile device, the location of the child's mobile device, and/or time limits on the child's mobile device. Therefore, a mobile application that is configured to run constantly may cease to function properly when the mobile application ceases to run for any reason.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for employing beacon messages to restart an application may be performed, at least in part, by a primary mobile device including one or more processors and by a secondary mobile device including one or more processors. The method may include subscribing, at the secondary mobile device, to a beacon publisher of the primary mobile device. The method may also include determining, based on historical location data of the secondary mobile device, that a likelihood that the primary mobile device is within range of the secondary mobile device for beacon communication therebetween is equal to or greater than a threshold likelihood. The method may further include activating, at the primary mobile device, the beacon publisher. The method may also include publishing, at the primary mobile device, a beacon message configured to cause a secondary mobile application on the secondary mobile device to restart. The method may further include receiving, at the secondary mobile device, the beacon message. The method may also include, in response to receiving the beacon message, restarting, at the secondary mobile device, the secondary mobile application of the secondary mobile device.

In some embodiments, the beacon publisher may include a Bluetooth Low Energy (BLE) beacon publisher.

In some embodiments, the determining may be performed on a predetermined schedule.

In some embodiments, the determining may be performed in response to determining, at the primary mobile device, that the secondary mobile application has not communicated with a server device within a threshold time period. In these embodiments, the method may further include, in response to the secondary mobile application restarting, reestablishing, by the secondary mobile device, communication between the secondary mobile device and the server device over the Internet. In these embodiments, the communication between the secondary mobile device and the server device over the Internet may include a ping communication, which may be from the secondary mobile application. In these embodiments, the communication between the secondary mobile device and the server device over the Internet may include a data log communication.

In some embodiments, the determining that the likelihood is equal to or greater than the threshold likelihood may be performed by the primary mobile device, such as by the primary mobile application of the primary mobile device.

In some embodiments, the determining that the likelihood is equal to or greater than the threshold likelihood may be performed by the server device, such as by a security application of the server device.

In some embodiments, the determining that the likelihood is equal to or greater than the threshold likelihood may be further based on current location data of the primary mobile device.

In some embodiments, the determining that the likelihood is equal to or greater than the threshold likelihood may be further based on historical location data of the primary mobile device.

In some embodiments, the method may further include pairing, at the primary mobile device and at the secondary mobile device, the primary mobile application of the primary mobile device and a secondary mobile application of the secondary mobile device.

In some embodiments, the primary mobile application may be a primary security application, and the secondary mobile application may be a secondary security application.

Further, in some embodiments, one or more non-transitory computer-readable media may include one or more computer-readable instructions that, when executed by one or more processors, cause the one or more processors to perform a method for employing beacon messages to restart an application.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
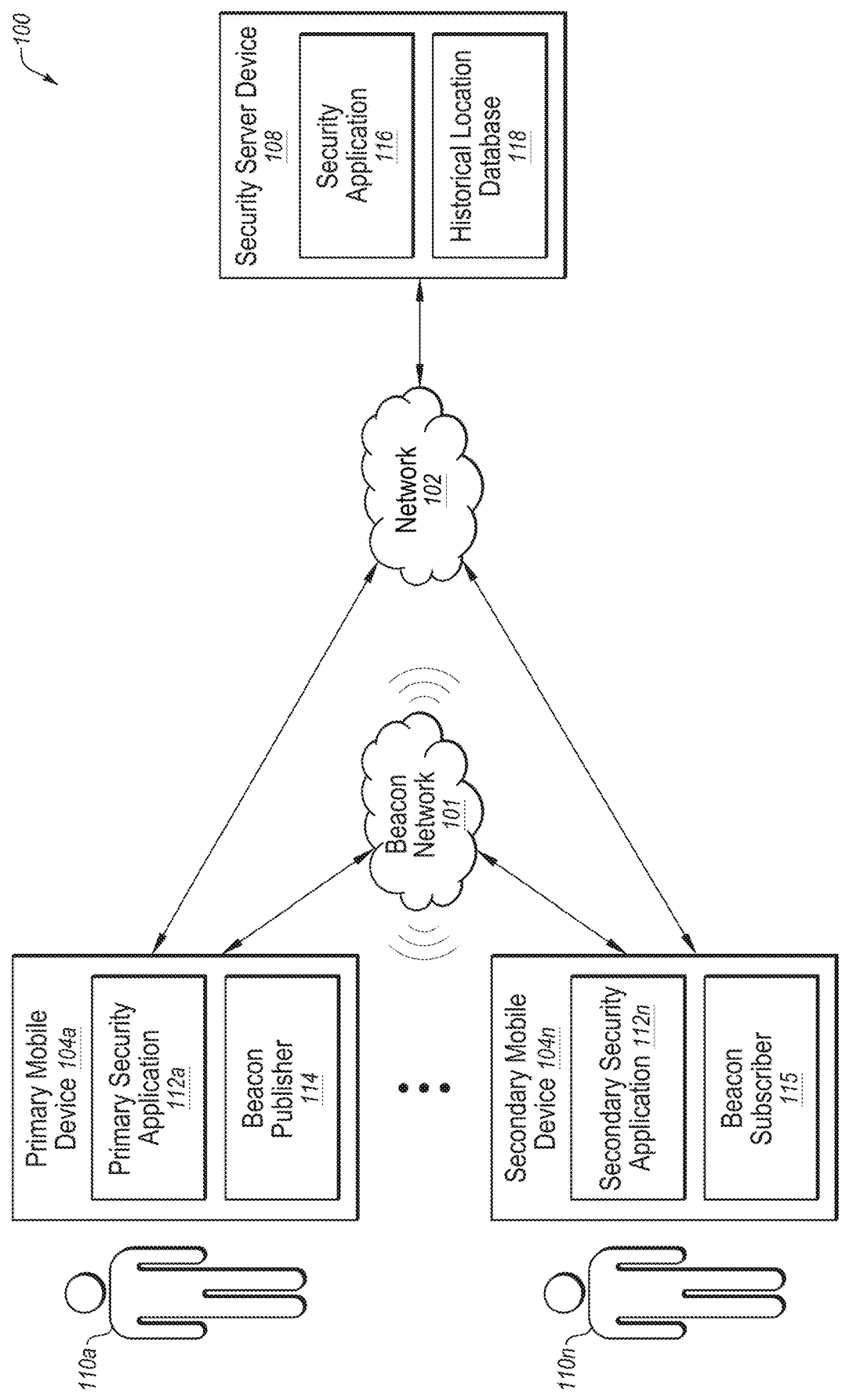
FIG. 1 illustrates an example system for employing beacon messages to restart an application.

While some mobile applications function properly when only run periodically, other mobile applications are configured to run constantly in order to function properly. One mobile application that is configured to run constantly in order to function properly is a security application that is configured to monitor and/or secure a mobile device. For example, the security application may be employed by a parent on a child's mobile device. Unfortunately, however, the security application may cease to run for some reason (e.g., if the child intentionally stops the security application on the mobile device, or if an operating system stops the security application on the mobile device to conserve resources, etc.). If the security application ceases to run, the child's mobile device will no longer send logs of monitored information to the parent's mobile device, and the parent will thus no longer be able to be regularly updated on the status of the child's mobile device. Therefore, a mobile application that is configured to run constantly may cease to function properly when the mobile application ceases to run for any reason.

Some embodiments disclosed herein may employ beacon messages to restart an application. For example, a primary application, such as a primary security application, running at a primary mobile device, may be paired with a secondary application, such as a secondary security application, running at a secondary mobile device. Then, the secondary mobile device may be subscribed to a beacon publisher of the primary mobile device. The primary security application (e.g., running on a parent's mobile device) may be configured to receive logs of monitored information from the secondary security application (e.g., running on a child's mobile device) on a regular basis (e.g., at some regular interval), but when the secondary security application has ceased running for some reason (e.g., if the child intentionally stops the security application on the mobile device, or if an operating system stops the security application on the mobile device to conserve resources, etc.), the logs of monitored information may no longer be regularly received, and the parent may become concerned and/or notified that the monitoring is potentially malfunctioning. To avoid this loss of regular communication, the secondary security application may be restarted. This restarting may be accomplished by a server security application, or the primary security application, determining that the primary mobile device is likely within range of the secondary mobile device for beacon communication therebetween, the beacon publisher publishing a beacon message at the primary mobile device that is configured to cause the secondary security application on the secondary mobile device to restart and, in response to receiving the beacon message, the secondary security application of the secondary mobile device being restarted.

In this manner, a mobile application that is configured to run constantly in order to function properly may be restarted on a secondary mobile device using a beacon publisher on a primary mobile device and a beacon subscriber on a secondary mobile device. By restarting the mobile application using the beacon publisher and the beacon subscriber, the mobile application can begin again to function properly when the mobile application has ceased to run for some reason.

This automatic restarting of the secondary security application using the beacon publisher and the beacon subscriber may further improve a "apparent false positive" situation of the secondary security application. For example, the secondary security application may be configured to send a "health" ping and/or various logs (e.g., location and web activities) every day to a backend security application over the Internet. If the backend security application notices that the secondary security application (e.g., of the child) has not sent the health ping and/or any log for an extended period of time, the backend security application may send an email, text, or other communication to the primary security application (e.g., of the parent) to alert them of the possible tampering on secondary mobile device (e.g., the child's mobile device). This may result in many apparent false positives in the situation where secondary security application was killed by the operating system of the secondary mobile device due to low system resources (e.g., with an Android operating system) or where the secondary security application was not woken up (e.g., by an iOS operating system) due to geo-fencing or significant location change due to limited device movement of the secondary mobile device (e.g., where the secondary mobile device of the child does not leave the child's home on the weekend). Parents who are apparently falsely alerted of tampering may become frustrated after verifying that the secondary security application appears to be working properly on child's device (e.g., when the parent goes to run the secondary security application on the child's mobile device, the secondary security application is manually restarted by the parent, without the parent knowing that the secondary security application was not running prior to them opening the secondary security application, thus believing that the alert was a "false positive."). Thus, by automatically restarting the secondary security application using the beacon publisher and the beacon subscriber, alerts to parents may be minimized, and apparent or actual false positives may also be minimized.

Turning to the figures, FIG. 1 illustrates an example system 100 for employing beacon messages to restart an application. The system 100 may include a network 102, a primary mobile device 104a, a secondary mobile device 104n, a beacon network 101, and a security server device 108.

In some embodiments, the network 102 may be configured to communicatively couple the primary mobile device 104a, the secondary mobile device 104n, and the security server device 108 to one another, and to other devices, using one or more network protocols, such as the network protocols available in connection with the World Wide Web. In some embodiments, the network 102 may be any wired or wireless network, or combination of multiple networks, configured to send and receive communications (e.g., via data packets) between systems and devices. In some embodiments, the network 102 may include a Personal Area Network (PAN), a Local Area Network (LAN), a Metropolitan Area Network (MAN), a Wide Area Network (WAN), a Storage Area Network (SAN), a telephone network, a cellular network the Internet, or some combination thereof.

Figure 3:
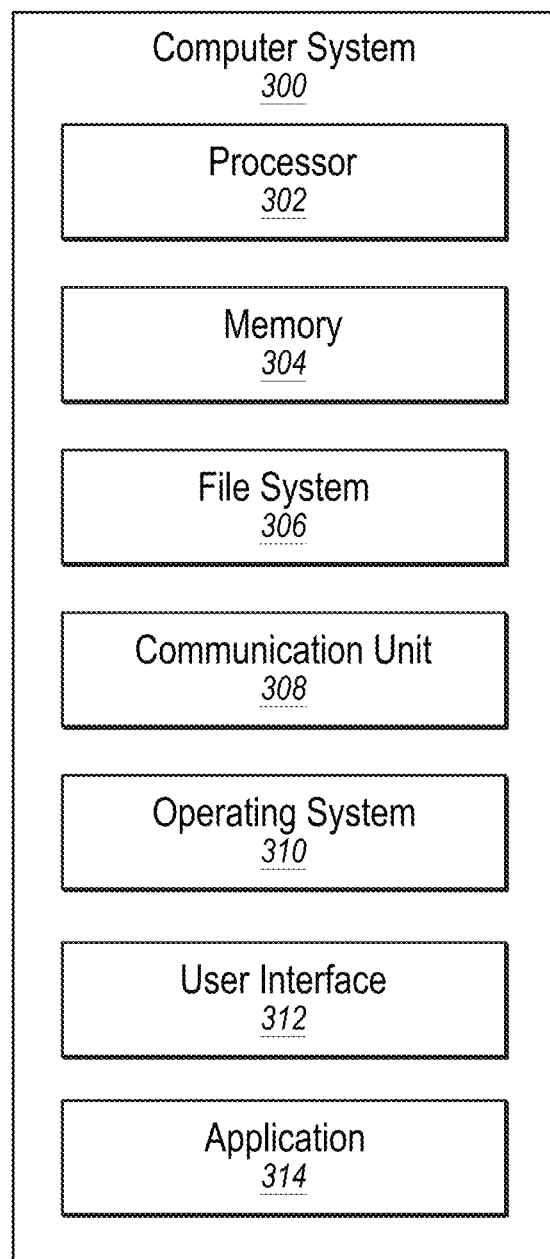
FIG. 3 illustrates an example computer system that may be employed for employing beacon messages to restart an application.

In some embodiments, the primary and secondary mobile devices 104a and 104n may be any computer system capable of communicating over the network 102 and the beacon network 101, examples of which are disclosed herein in connection with the computer system 300 of FIG. 3. The primary and secondary mobile devices 104a-104n may include primary and secondary security applications 112a-112n which may be employed by users 110a-110n to monitor and/or secure the primary and secondary mobile devices 104a and 104n. The primary and secondary security applications 112a-112n may be configured to function in connection with a beacon publisher 114 and a beacon subscriber 115, which may communicate over the beacon network 101.

In some embodiments, the beacon publisher 114 may be configured to function in connection with a hardware transmitter, such as a Bluetooth Low Energy (BLE) hardware transmitter, that may be configured to broadcast a beacon message to nearby mobile devices. Similarly, in some embodiments, the beacon subscriber 115 may be configured to function in connection with a hardware receiver, such as a Bluetooth Low Energy (BLE) hardware receiver, that may be configured to receive a beacon message that is broadcast from nearby mobile devices. The beacon publisher 114 and the beacon subscriber 115 may enable the primary and secondary mobile devices 104a and 104n to communicate via beacon messages over the beacon network 101 when the primary and secondary mobile devices 104a and 104n are within a relatively close proximity to one another.

In some embodiments, the security server device 108 may be any computer system capable of communicating over the network 102 and capable of hosting a security application 116 and a historical location database 118, examples of which are disclosed herein in connection with the computer system 300 of FIG. 3. In some embodiments, the historical location database 118 may be employed to store historical location information of the primary and secondary mobile devices 104a and 104n, which may enable the security application 116 to accurately predict when the primary and secondary mobile devices 104a and 104n will likely be within range of one another for beacon communication therebetween. For example, where the user 110a is a parent and the user 110n is a child, the historical location database 118 may track the primary and secondary mobile devices 104a and 104n over time, and the security application 116 may determine that the primary and secondary mobile devices 104a and 104n are not likely (e.g., under some threshold such at 90% of the time) within range of one another for beacon communication therebetween on weekdays (e.g., because the parent is at work and the child is at school during weekdays), but may determine that the primary and secondary mobile devices 104a and 104n are likely (e.g., at or over some threshold such at 90% of the time) within range of one another for beacon communication therebetween on weekends (e.g., because the parent is off work and the child is off school during weekends).

In some embodiments, the primary and secondary security applications 112a-112n and the security application 116 may be, or may include the functionality of, Norton™ Family applications, made by NortonLifeLock, Inc.™

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
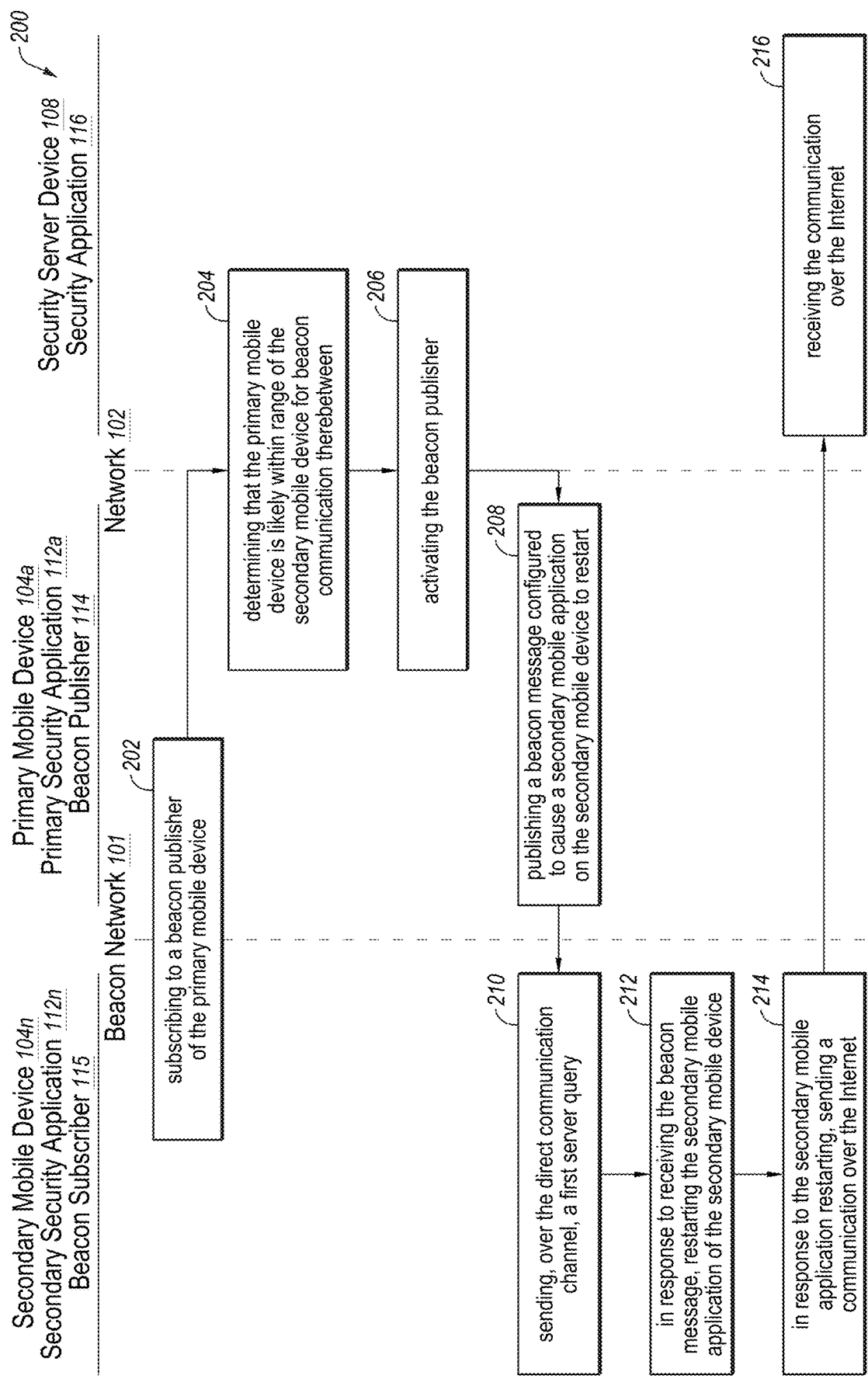
FIG. 2 is a flowchart of an example method for employing beacon messages to restart an application.

FIG. 2 is a flowchart of an example method 200 for employing beacon messages to restart an application. The method 200 may be performed, in some embodiments, by a device or system, such as by the primary security application 112a on the primary mobile device 104a, the secondary security application 112n on the secondary mobile device 104n, and/or the security application 116 on the security server device 108, or some other application or system, or some combination thereof. In these and other embodiments, the method 200 may be performed by one or more processors based on one or more computer-readable instructions stored on one or more non-transitory computer-readable media. The method 200 will now be described in connection with FIGS. 1 and 2.

The method 200 may include, at action 202, subscribing to a beacon publisher of the primary mobile device. In some embodiments, the beacon publisher may include a Bluetooth Low Energy (BLE) beacon publisher. For example, the beacon subscriber 115 at the secondary mobile device 104n may be subscribed, at action 202, to the beacon publisher 114 of the primary mobile device 104a, which may be a BLE beacon publisher, or some other type of beacon publisher.

The method 200 may also include, either before or after action 202, pairing, at the primary mobile device and at the secondary mobile device, the primary mobile application of the primary mobile device and a secondary mobile application of the secondary mobile device. For example, the primary security application 112a may be paired with the secondary security application 112n.

The method 200 may include, at action 204, determining that the primary mobile device is likely within range of the secondary mobile device for beacon communication therebetween. In some embodiments, the determining at action 204 may be based at least in part on historical location data of the primary mobile device and/or secondary mobile device. In some embodiments, the determining at action 204 may be based on the likelihood being equal to or greater than a threshold. In some embodiments, the determining that the likelihood is equal to or greater than the threshold likelihood may be further based on current location data of the primary mobile device. In these embodiments, the determining that the likelihood is equal to or greater than the threshold likelihood may be performed by a server device or by the primary mobile device, such as by the primary mobile application of the primary mobile device. For example, the security application 116 on the security server device 108, and/or the primary security application 112a on the primary mobile device 104a, may determine, at action 204, that the likelihood that the primary mobile device 104a is within range of the secondary mobile device 104n for beacon communication therebetween is equal to or greater than a threshold (e.g., 90% likelihood threshold). This determination may be based at least partially on current location data and historical location data of the primary mobile device 104a and/or secondary mobile device 104n, that may be stored in the historical location database 118 (e.g., based on the primary mobile device 104a and secondary mobile device 104n historically being within range of one another at a certain time of day on a certain day of the week at least 90% of the time).

In some embodiments, the determining at action 204 may be performed on a predetermined schedule. In some embodiments, the determining at action 204 may be performed in response to determining, at the primary mobile device, that the secondary mobile application has not communicated with a server device within a threshold time period. For example, the determination at action 204 may be performed on a predetermined schedule (e.g., every minute, every ten minutes, every hour, twice per day, etc.). Further, the determining at action 204 may be performed in response to determining, at the primary mobile device 104a, that the secondary mobile application 112n has not communicated with the security application 116 on the security server device 108 within a threshold time period (e.g., one minute, ten minutes, one hour, twelve hours, etc.).

The method 200 may include, at action 206, activating the beacon publisher. For example, the primary security application 112a may activate, at action 206, the beacon publisher 114 at the primary mobile device 104a. This activation may be periodic, rather than the beacon publisher being constantly activated, to preserve the battery and/or other resources of the primary mobile device 104a.

The method 200 may include, at action 208, publishing a beacon message configured to cause a secondary mobile application on the secondary mobile device to restart. For example, the primary security application 112a may publish, at action 208, a beacon message using the beacon publisher 114 and over the beacon network 101. The beacon message may be configured to cause the secondary security application 112n on the secondary mobile device 104n to restart.

The method 200 may include, at action 210, receiving the beacon message. For example, the beacon subscriber 115 may receive, at action 210, the beacon message over the beacon network 101.

The method 200 may include, at action 212, in response to receiving the beacon message, restarting, at the secondary mobile device, the secondary mobile application of the secondary mobile device. For example, an operating system of the secondary mobile device 104n may restart, at action 212, the secondary security application 112n of the secondary mobile device 104n in response to the beacon subscriber 115 receiving the beacon message.

The method 200 may include, at action 214, in response to the secondary mobile application restarting, sending a communication over the Internet. For example, the secondary security application 112n may send a communication over the network 102 (e.g., the Internet) in response to the secondary security application 112n. This may include reestablishing, by the secondary security application 112n, communication between the secondary mobile device 104n and the security server device 108 over the network 102 (e.g., the Internet).

The method 200 may include, at action 216, receiving the communication over the Internet. In some embodiments, the communication between the secondary mobile device and the server device over the Internet may include a ping communication, which may be from the secondary mobile application. In some embodiments, the communication between the secondary mobile device and the server device over the Internet may include a data log communication. For example, the security application 116 may receive, at action 216, the communication over the network 102 (e.g., the Internet), which may be a "health" ping and/or various logs.

The method 200 may thus be employed, to restart the secondary security application 112n on the secondary mobile device 104n using the beacon publisher 114 on the primary mobile device 104a and the beacon subscriber 115 on the secondary mobile device 104n. By restarting the secondary security application 112n using the beacon publisher 114 and the beacon subscriber 115, the secondary security application 112n can begin again to function properly when the secondary security application 112n has ceased to run for some reason (e.g., when an operating system stops the secondary security application 112n on the secondary mobile device 104n to conserve resources, etc.). Further, by activating the beacon publisher 114 only when it is determined that it is likely that the primary mobile device 104a is within range of the secondary mobile device 104n for beacon communication therebetween (e.g., based on historical location data of the primary mobile device 104a and/or the secondary mobile device 104n), a battery and/or other resource of the primary mobile device 104a may be more efficiently utilized than where the beacon publisher 114 is activated constantly.

Although the actions of the method 200 are illustrated in FIG. 2 as discrete actions, various actions may be divided into additional actions, combined into fewer actions, reordered, expanded, or eliminated, depending on the desired implementation. For example, actions 208, 210, and 212 may be performed without performing the other actions of the method 200. In another example, action 216 may not be performed in the method 200.

Further, it is understood that the method 200 may improve the functioning of a mobile device itself and may improve the technical field of remotely restarting mobile applications. For example, the functioning of the secondary mobile device 104n of FIG. 1 may itself be improved by the method 200 by remotely restarting the secondary security application 112n on the secondary mobile device 104n using the beacon publisher 114 on the primary mobile device 104a and the beacon subscriber 115 on the secondary mobile device 104n, thus causing the secondary security application 112n to again function properly when the secondary security application 112n has ceased to run for some reason.

FIG. 3 illustrates an example computer system 300 that may employ beacon messages to restart an application. In some embodiments, the computer system 300 may be part of any of the systems or devices described in this disclosure. For example, the computer system 300 may be part of any of the primary mobile device 104a, the secondary mobile device 104n, and the security server device 108 of FIG. 1.

The computer system 300 may include a processor 302, a memory 304, a file system 306, a communication unit 308, an operating system 310, a user interface 312, and an application 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software applications and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIG. 2. These computer-executable instructions may be included, for example, in the operating system 310, in one or more applications, such as the primary security application 112a, the secondary security application 112n, or the security application 116 of FIG. 1, or in some combination thereof.

The communication unit 308 may include any component, device, system, or combination thereof configured to transmit or receive information over a network, such as the beacon network 101 or the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a Wi-Max device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more actions of the method 200 of FIG. 2. In some embodiments, the application 314 (e.g., app) may be part of the operating system 310 or may be part of an application of the computer system 300, or may be some combination thereof. In some embodiments, the application 314 may function as any of the primary security application 112a, the secondary security application 112n, or the security application 116 of FIG. 1, or in some combination thereof.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general-purpose computer (e.g., the processor 302 of FIG. 3) including various computer hardware or software applications, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for employing beacon messages to restart an application, at least a portion of the method being performed by a primary mobile device comprising one or more processors and by a secondary mobile device comprising one or more processors, the method comprising:
  subscribing, at the secondary mobile device, to a beacon publisher of the primary mobile device;
  determining, at the primary mobile device, that a secondary mobile application on the secondary mobile device has not communicated with a server device within a threshold time period;
  determining, based on historical location data of the secondary mobile device, that a likelihood that the primary mobile device is within range of the secondary mobile device for beacon communication therebetween is equal to or greater than a threshold likelihood;
  activating, at the primary mobile device, the beacon publisher;
  publishing, at the primary mobile device, a beacon message configured to cause the secondary mobile application on the secondary mobile device to restart;
  receiving, at the secondary mobile device, the beacon message; and
  in response to receiving the beacon message, restarting, at the secondary mobile device, the secondary mobile application of the secondary mobile device.

2. The method of claim 1, wherein the beacon publisher comprises a Bluetooth Low Energy (BLE) beacon publisher.

3. The method of claim 1, wherein the determining that the likelihood is equal to or greater than the threshold likelihood is performed on a predetermined schedule.

4. The method of claim 1, further comprising:
  in response to the secondary mobile application restarting, reestablishing, by the secondary mobile device, communication between the secondary mobile device and the server device over the Internet.

5. The method of claim 4, wherein the communication between the secondary mobile device and the server device over the Internet comprises a ping communication.

6. The method of claim 4, wherein the communication between the secondary mobile device and the server device over the Internet comprises a data log communication.

7. The method of claim 4, wherein the determining that the likelihood is equal to or greater than the threshold likelihood is performed by the server device.

8. The method of claim 1, wherein the determining that the likelihood is equal to or greater than the threshold likelihood is performed by the primary mobile device.

9. The method of claim 1, wherein the determining that the likelihood is equal to or greater than the threshold likelihood is further based on current location data of the primary mobile device.

10. The method of claim 1, wherein the determining that the likelihood is equal to or greater than the threshold likelihood is further based on historical location data of the primary mobile device.

11. A computer-implemented method for employing beacon messages to restart an application, at least a portion of the method being performed by a primary mobile device comprising one or more processors and by a secondary mobile device comprising one or more processors, the method comprising:
  pairing, at the primary mobile device and at the secondary mobile device, a primary security application of the primary mobile device and a secondary security application of the secondary mobile device;
  subscribing, at the secondary mobile device, to a beacon publisher of the primary mobile device;
  determining that the secondary security application has not communicated with a server security application of a server device within a threshold time period;
  determining, based on historical location data of the secondary mobile device, that a likelihood that the primary mobile device is within range of the secondary mobile device for beacon communication therebetween is equal to or greater than a threshold likelihood;
  activating, at the primary mobile device, the beacon publisher;
  publishing, at the primary mobile device, a beacon message configured to cause the secondary security application on the secondary mobile device to restart;

receiving, at the secondary mobile device, the beacon message; and in response to receiving the beacon message, restarting, at the secondary mobile device, the secondary security application of the secondary mobile device.

12. The method of claim 11, wherein the beacon publisher comprises a Bluetooth Low Energy (BLE) beacon publisher.

13. The method of claim 11, further comprising:

in response to the secondary security application restarting, reestablishing, by the secondary security application, communication between the secondary mobile device and the server device over the Internet.

14. The method of claim 13, wherein the communication between the secondary mobile device and the server device over the Internet comprises a ping communication from the secondary security application.

15. The method of claim 13, wherein the communication between the secondary mobile device and the server device over the Internet comprises a data log communication.

16. The method of claim 13, wherein the determining that the likelihood is equal to or greater than the threshold likelihood is performed by the server device.

17. The method of claim 13, wherein the determining that the likelihood is equal to or greater than the threshold likelihood is performed by the primary security application of the primary mobile device.

18. The method of claim 13, wherein the determining that the likelihood is equal to or greater than the threshold likelihood is further based on current location data of the primary mobile device.

19. The method of claim 13, wherein the determining that the likelihood is equal to or greater than the threshold likelihood is further based on historical location data of the primary mobile device.

20. A computer-implemented method for employing beacon messages to restart an application, at least a portion of the method being performed by a primary mobile device comprising one or more processors and by a secondary mobile device comprising one or more processors, the method comprising:

subscribing, at the secondary mobile device, to a beacon publisher of the primary mobile device;

receiving historical location data for the primary mobile device and the secondary mobile device;

identifying, within the historical location data, a time of day during which the primary mobile device and the secondary mobile device are within beacon communication range of one another on at least a threshold percentage of days within the historical location data;

determining, based on the identified time of day, that the primary mobile device is within range of the secondary mobile device for beacon communication therebetween;

activating, at the primary mobile device, the beacon publisher;

publishing, at the primary mobile device, a beacon message configured to cause a secondary mobile application on the secondary mobile device to restart;

receiving, at the secondary mobile device, the beacon message; and in response to receiving the beacon message, restarting, at the secondary mobile device, the secondary mobile application of the secondary mobile device.

\* \* \* \* \*